(12) United States Patent
Widener et al.

(10) Patent No.: US 10,921,784 B2
(45) Date of Patent: Feb. 16, 2021

(54) COLD SPRAY MANUFACTURING AND REPAIR CELL

(71) Applicant: South Dakota Board of Regents, Pierre, SD (US)

(72) Inventors: Christian Widener, Rapid City, SD (US); Victor Champagne, Aberdeen Proving Ground, SD (US); Robert Hrabe, Rapid City, SD (US)

(73) Assignees: SOUTH DAKOTA BOARD OF REGENTS, Pierre, SD (US); GOVERNMENT OF THE UNITED STATES OF AMERICA, AS REPRESENTED BY THE SECRETARY OF THE ARMY, Washington, DC (US)

( * ) Notice: Subject to any disclaimer, the term of this patent is extended or adjusted under 35 U.S.C. 154(b) by 16 days.

(21) Appl. No.: 16/312,187

(22) PCT Filed: Jun. 21, 2017

(86) PCT No.: PCT/US2017/038604
§ 371 (c)(1),
(2) Date: Dec. 20, 2018

(87) PCT Pub. No.: WO2017/223236
PCT Pub. Date: Dec. 28, 2017

(65) Prior Publication Data
US 2019/0235477 A1    Aug. 1, 2019

Related U.S. Application Data

(60) Provisional application No. 62/354,537, filed on Jun. 24, 2016, provisional application No. 62/352,929, filed on Jun. 21, 2016.

(51) Int. Cl.
*G05B 19/4155* (2006.01)
*C23C 24/04* (2006.01)
(Continued)

(52) U.S. Cl.
CPC .......... *G05B 19/4155* (2013.01); *C22C 38/02* (2013.01); *C22C 38/08* (2013.01); *C23C 24/04* (2013.01); *G05B 2219/32228* (2013.01)

(58) Field of Classification Search
CPC .................................................. C23C 24/04
(Continued)

(56) References Cited

U.S. PATENT DOCUMENTS

2004/0197493 A1   10/2004   Renn et al.
2008/0008968 A1   1/2008    Zombo
(Continued)

OTHER PUBLICATIONS

International Preliminary Report on Patentability, PCT/US17138604, dated Jan. 3, 2019, 9 pages.
(Continued)

*Primary Examiner* — Md Azad
(74) *Attorney, Agent, or Firm* — Goodhue, Coleman & Owens, P.C.

(57) ABSTRACT

The present disclosure addresses limitations with methods, systems and processes for integrating multiple advanced technologies into a single automated manufacturing and repair cell. The methods, systems and processes of the present disclosure leverage unique software and hardware to configure a manufacturing cell that is capable of conducting process development and planning, dimensional analysis, pre-machining, surface preparation, cold spray (supersonic particle deposition), dust collection, helium recovery, and post machining in a single integrated manufacturing and repair cell.

20 Claims, 5 Drawing Sheets

(51) Int. Cl.
*C22C 38/08* (2006.01)
*C22C 38/02* (2006.01)

(58) Field of Classification Search
USPC .......................................................... 700/117
See application file for complete search history.

(56) References Cited

U.S. PATENT DOCUMENTS

| 2010/0187119 | A1* | 7/2010 | Almond | C23C 24/04 |
| | | | | 205/115 |
| 2014/0115854 | A1* | 5/2014 | Widener | B23P 6/00 |
| | | | | 29/402.18 |
| 2014/0117109 | A1* | 5/2014 | Widener | B05B 7/1693 |
| | | | | 239/135 |
| 2014/0163717 | A1* | 6/2014 | Das | C30B 13/28 |
| | | | | 700/119 |
| 2014/0277669 | A1 | 9/2014 | Nardi et al. | |
| 2015/0165697 | A1 | 6/2015 | Gulizia et al. | |
| 2015/0315714 | A1 | 11/2015 | Vijay et al. | |
| 2017/0341018 | A1* | 11/2017 | She | B01D 53/30 |

OTHER PUBLICATIONS

International Search Report and The Written Opinion, PCT/US17/038604, dated Sep. 7, 2017, 15 pages.

\* cited by examiner

COLD SPRAY MANUFACTURING AND REPAIR CELL

CROSS-REFERENCE TO RELATED APPLICATIONS

This application is a 371 of International Application No PCT/US17/38604, filed Jun. 21, 2017, which claims the benefit of U.S. Provisional Application Ser. No. 62/352,929 filed Jun. 21, 2016 and 62/354,537 filed Jun. 24, 2016, which are incorporated by reference in their entirety.

BACKGROUND

I. Field of the Disclosure

Novel methods, systems and processes for integrating multiple advanced technologies into a single automated manufacturing and repair cell. The methods, systems and processes of the present disclosure leverage unique software and hardware to configure a manufacturing cell that is capable of conducting process development and planning, dimensional analysis, pre-machining, surface preparation, cold spray (supersonic particle deposition), dust collection, helium recovery, and post machining in a single integrated manufacturing and repair cell.

II. Description of the Prior Art

New advanced technologies, such as cold spray, enable additive manufacturing and repair of components that previously has not been possible. In order for these processes to be effective from both technical and economic standpoints, multiple operations must be performed on the same component and resources such as helium must be recycled for use on multiple parts. Repair of a single component can take weeks or months and thousands of dollars to accomplish with conventional methods.

Therefore methods, systems and processes are needed for an integrated seemless repair and manufacturing cell that can conduct multiple operations on a part while also maintaining strict tolerances and recovering expensive resources such as helium. What is also needed are methods, systems, and processes that enable repair of very large components (~14 Cubic Feet volume) and very long components (~60 feet) and can be integrated with many different types of machine tools for highly accurate machining.

SUMMARY

The present disclosure addresses limitations in current cold spray technologies, specifically cold spray enabled additive manufacturing and repair of components. In order for these processes to be effective from both technical economic standpoints, multiple operations must be performed on the same component and resources such as helium must be recycled for use on multiple parts. Repair of a single component can take weeks or months and thousands of dollars to accomplish using conventional methods.

According to at least one exemplary aspect, an automated cold spray manufacturing and repair cell is disclosed. The automated cold spray manufacturing and repair cell includes a manufacturing cell having an enclosure body operably configured for housing an automated cold spray operation and one or more hardware devices and one or more software tools wherein one or more of the hardware devices and one or more of the software tools are housed within the enclosure body, and further wherein the one or more hardware devices and the one or more software tools are configured to perform one or more tasks associated with the cold spray operation. In conjunction with the cell, a programmable logic controller can be provided having a control system with coding operable on a computer readable medium, wherein the coding controls one or more hardware devices and one or more software devices for automating the cold spray operation. The cell also includes one or more inputs introduced into the enclosure body for the one or more tasks associated with the cold spray operation, wherein at least one of the one or more inputs is repurposed and/or recycled within the enclosure body for supporting at least one or more of the tasks associated with the cold spray operation.

According to at least one other exemplary aspect, a method for controlling an automated cold spray manufacturing and repair cell is disclosed. The method includes providing a manufacturing cell having an enclosure body operably configured for housing an automated cold spray operation and a programmable logic controller having a control system with coding operable on a computer readable medium and controlling one or more hardware devices and one or more software tools, wherein one or more of the hardware devices and the one or more software tools are housed within the enclosure body. One or more software controls can be coded on the programmable logic controller for executing one or more tasks of the cold spray operation. One or more inputs can be introduced into the enclosure body, wherein at least one of the one or more inputs is repurposed and/or recycled within the enclosure body for supporting at least two or more of the one or more tasks associated with the cold spray operation. In a preferred form, the one or more tasks comprise process development, process planning, and dimensional analysis. In another preferred form, the one or more tasks comprise pre-machining, surface preparation, cold spray deposition, dust collection, helium recovery, and post machining.

BRIEF DESCRIPTION OF THE DRAWINGS

Illustrated embodiments of the disclosure are described in detail below with reference to the attached drawing figures, which are incorporated by reference herein, and where.

DETAILED DESCRIPTION

1. Introduction

The present disclosure is directed to novel methods, systems and processes of integrating multiple advanced technologies into a single automated manufacturing and repair cell.

2. Materials & Methods

Figure 1:
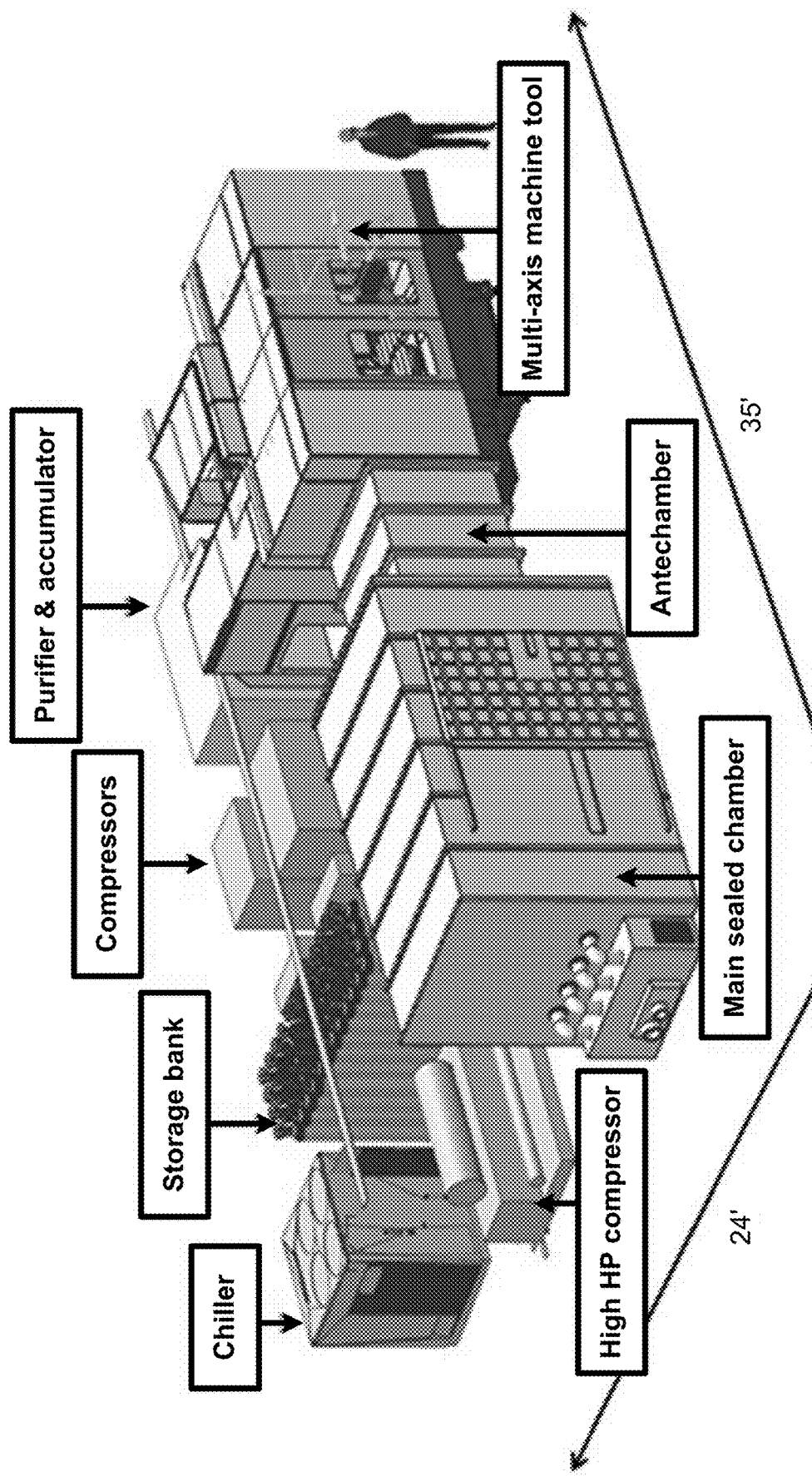
FIG. 1 is a pictorial representation of an advanced cold spray manufacturing and repair cell in accordance with an illustrative aspect of the present disclosure.
Figure 2:
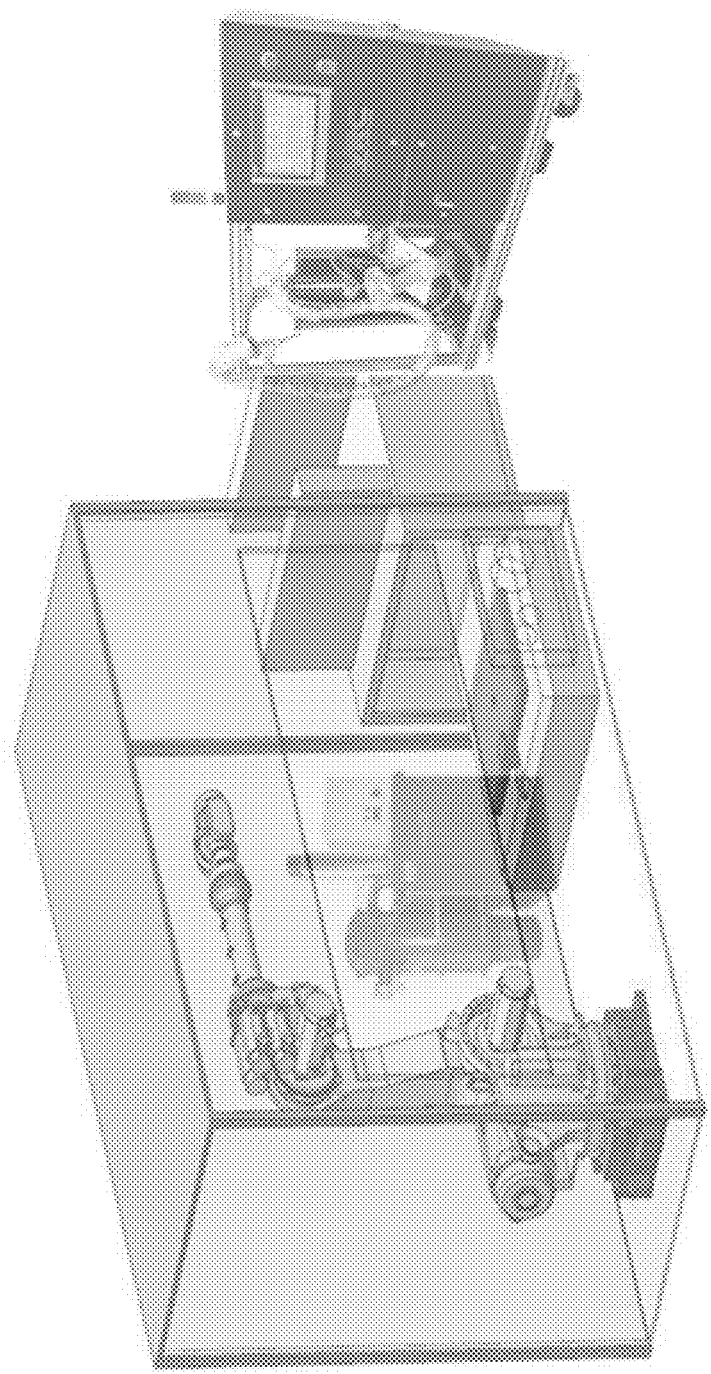
FIG. 2. is a pictorial representation of a main sealed chamber with a robot, a dust collector and a cold spray system in accordance with an illustrative aspect of the present disclosure.

The disclosed methods, systems and processes leverage unique software and hardware to configure a manufacturing cell that is capable of conducting process development and planning, dimensional analysis, pre-machining, surface preparation, cold spray (supersonic particle deposition), dust collection, helium recovery, and post machining in a single integrated manufacturing and repair cell. FIG. 1 is an illustration of the exemplary system of the present disclosure. The cold spray manufacturing and repair cell shown in FIG. 1 can include a main sealed chamber and an antechamber operably connected to provide a sealed communication therebetween. The main sealed chamber and the antechamber are both operably connected, preferably in sealed communication, with a machine tool chamber (e.g., housing a Haas MULTI-AXIS MACHINE TOOL). The main sealed chamber shown in both FIGS. 1-2 can contain an articulated robot with a turn table, a VRC Gen 3 Portable Cold Spray System, a central extraction system used for the collection of overspray dust particles and return of Helium into the enclosure. A cold spray system can be of the type shown and described in U.S. application Ser. No. 14/066,346 and Ser. No. 14/066,44, titled Cold Spray Device and System and Methods for Cold Spray Repair, respectively are incorporated herein in their entirety by reference. The main sealed chamber can also be operably configured with a cold spray radial coating system for cold spray of tubular shaped parts. The cold spray radial coating system can be integrated with one or more of the existing cold spray systems, such as those set forth and incorporated by reference above.

The main chamber is connected to a multi-axis machine tool (i.e., Haas EC-1600) machine tool chamber (this could be any compatible off the shelf machine tool) through an antechamber. The machining chamber can be configured with a variety of machine tools, such as a multi-axis machine tool that is operably configured with a part scanner, pallet handling/transfer system, automatic tool changer. To facilitate pallet movement, the system can include a pallet transition operably connected between chambers. This antechamber allows the main chamber to remain full of helium (80% or more purity) while the component is moved via a pallet changer to a multi-axis machine tool for post cold spray machining. Unique software code is written to integrate software packages which to allow full programming of the entire repair or manufacturing process from initial laser scan and or dimensional probing with the multi-axis machine tool, to pre-machining of the part, to the cold spray operation inside the main chamber, back to post machining and final dimensional probing or nondestructive inspection. Thus, a repaired part or a part to be repaired can be moved in a sealed environment between the main sealed chamber and the machine tool chamber through the antechamber. The methods, systems, and processes of the present disclosure enable repair of very large components (~14 Cubic Feet volume) and very long components (~60 feet) and can be integrated with many different types of machine tools for highly accurate machining.

Figure 3:
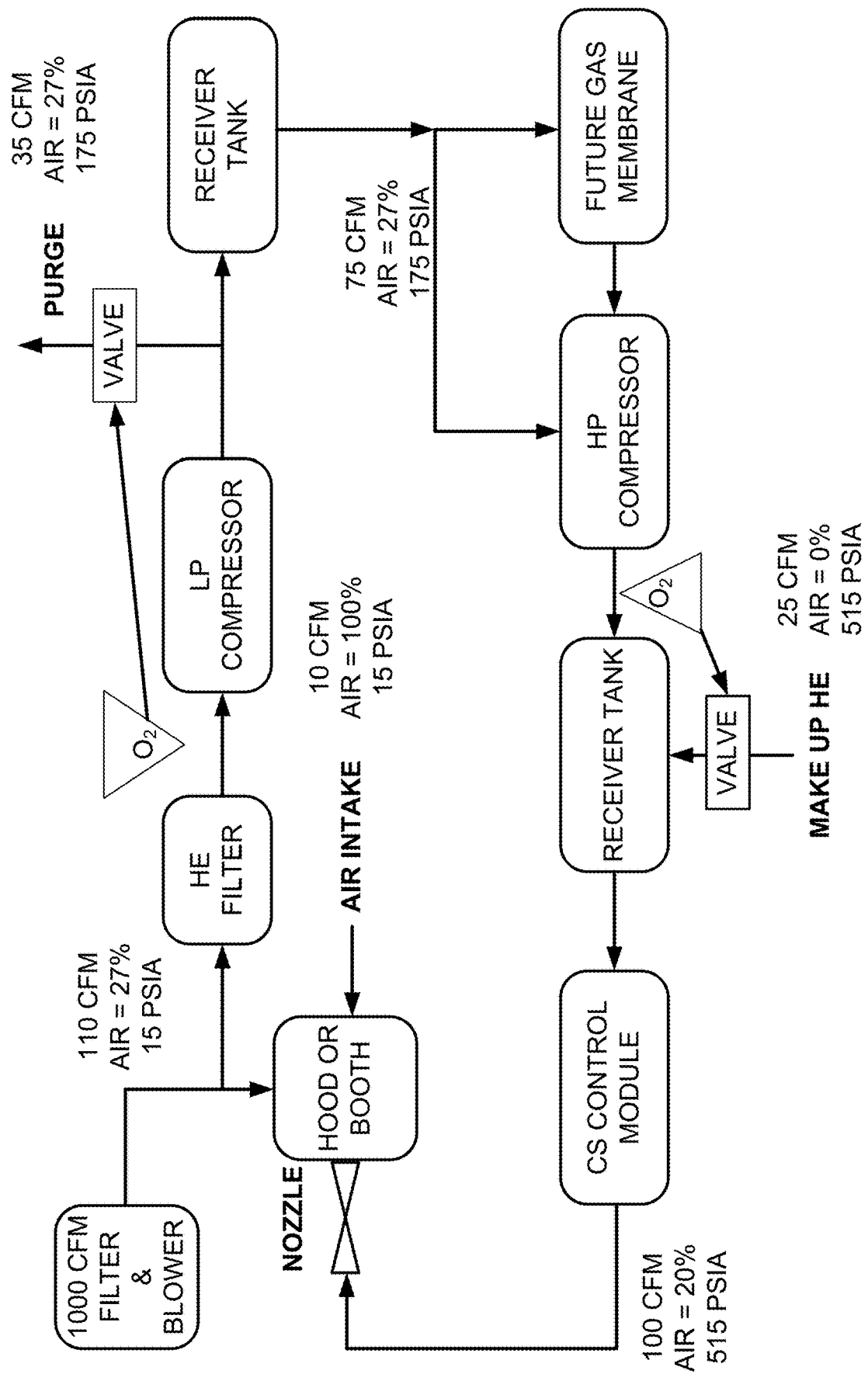
FIG. 3. is a schematic diagram of a helium recovery system in accordance with an illustrative aspect of the present disclosure.

The Helium recovery system can be connected in sealed communication to the main chamber, the antechamber, and the machining chamber, and maintains the helium purity in the chamber at or above 80%. A system for Helium recovery can include a purifier & accumulator, compressor, storage bank, and chiller, as shown in FIG. 1. FIG. 3 provides a detailed schematic diagram of an exemplary helium recovery system, such as the one shown in FIG. 1.

FIG. 3 shows a cold spray nozzle of the type contemplated above. The cold spray nozzle receives inputs under operably control using the cold spray ("CS") control module. Inputs include one or more gases, including, for example, Oxygen ($O_2$) and Helium (He). The inputs can be provided to the nozzle at the noted rate (100 CFM), composition (Air=20%), and pressure (515 psia). The nozzle can be connected to a receiver tank operably connected to a Helium source. The Helium source can provide make up Helium to the recovery system, for example, at the noted rate (25 CFM), composition (Air=0%), and pressure (515 psia). A valve can be operably connected to the receiver tank and the Helium source. Other inputs can be operably connected to the receiver tank via the valve, such as an Oxygen source. The receiver tank can also be operably configured into the recovery system to reclaim and recycle recovered Helium from the nozzle during a cold spray operation. Expensive inputs into the nozzle, such as Helium, can be recovered using a hood/booth having air intake, for example, at the noted rate (10 CFM), composition (Air=100%), and pressure (15 psia). The hood/booth can be operably connected in sealed communication with a filter and blower, such as a 1000 CFM filter and blower. Collections from the cold spray process through the hood/booth can be filtered to reclaim gases, such as Helium, for example, by operably connecting a Helium filter into sealed communication with the hood/booth, for example, at the noted rate (110 CFM), composition (Air=27%), and pressure (15 psia). Oxygen can be purged from the Helium recovery process and exhausted via a purge valve at the noted rate (35 CFM), composition (Air=27%), and pressure (175 psia). Recovered Helium from the Helium filter can be communicated into a receiver tank by a low pressure (LP) compressor. The purge valve can be connected between the LP compressor and receiver tank to purge the line, for example, at the noted rate (35 CFM), composition (Air=27%), and pressure (175 psia). A high pressure (HP) compressor can be operably connected in sealed communication between the two receiver tanks. The input into the HP compressor can be, for example, at the noted rate (75 CFM), composition (Air=27%), and pressure (175 psia). In this manner, Helium gas can be recovered from and recycled back to the cold spray nozzle. The system contemplates the use of additional membranes for recovering and recycling inputs to the cold spray process.

Figure 4:
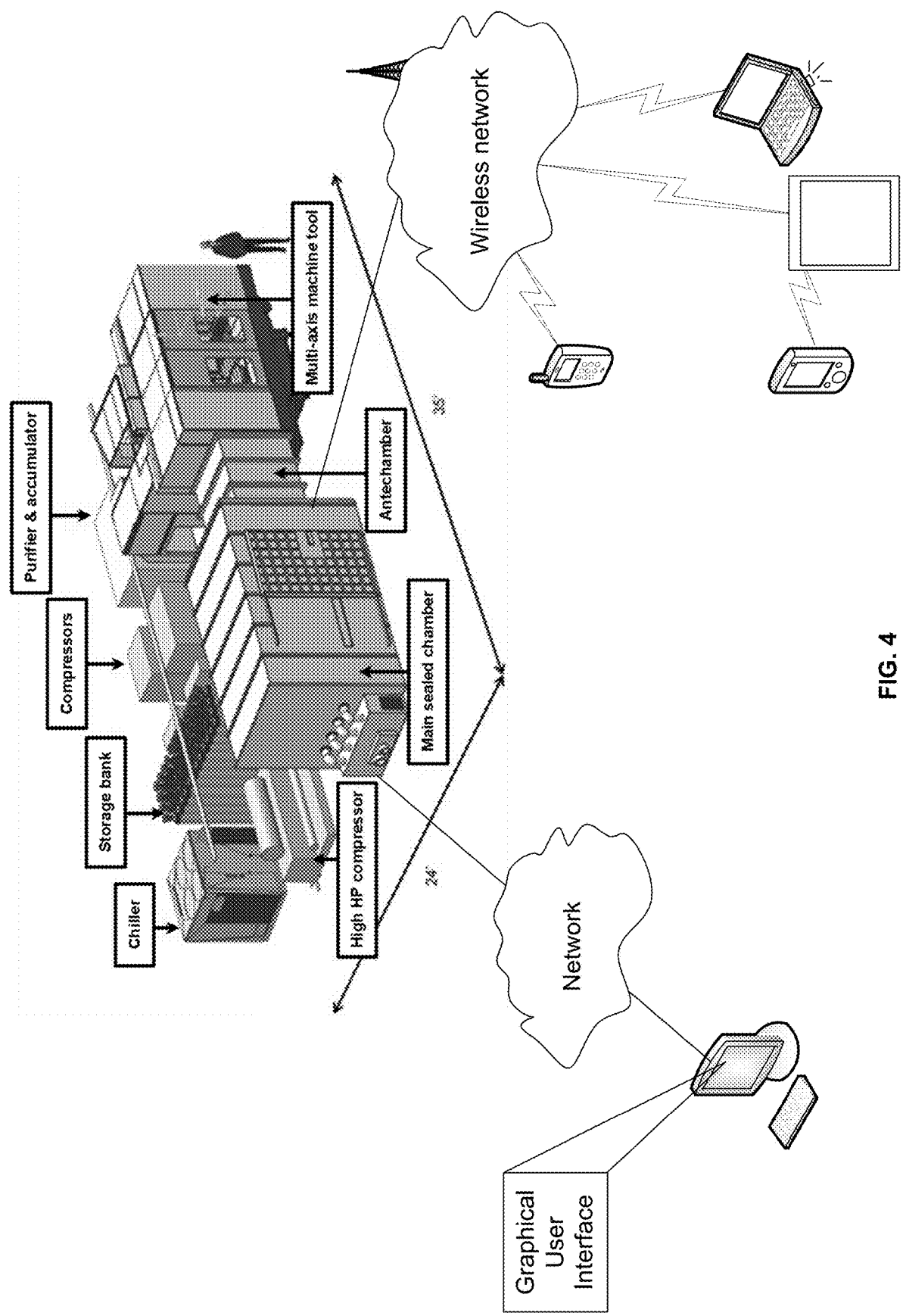
FIG. 4. is another schematic representation of a system and process in accordance with an illustrative aspect of the present disclosure.

FIG. 4 provides a pictorial representation of a data and/or communications management system that uses one or more devices, infrastructure, and platforms for enabling, initiating, routing, and managing communication between an electronic or computing device and components of the data/communication system in operable communication and/or control of the Cold Spray Manufacturing and Repair Cell (CSMRC) of the present disclosure. For example, a data and/or communications management system can be used to control process development and planning, dimensional analysis, pre-machining, surface preparation, cold spray (supersonic particle deposition), dust collection, helium recovery, and post machining. The system illustrated in FIG. 4 may include one or more devices networked to manage the network or wireless network. For example, the data or communications management system may include any number of servers (i.e., application, database, name, proxy, web, mobile, communications, catalog, etc.), routers, switches, or advanced intelligent network devices. In one aspect, the data or communications management system, network and wireless network may represent a cloud network system (or managing portions of a cloud network), mesh network, or server farm. The data or communications management system, network, or wireless network may also include web servers or database servers. The servers may communicate data and perform other features associated with the cold spray manufacturing and repair cell of the present disclosure.

In one embodiment, the data/communications management system can generate a portal usable by one or more devices (e.g., laptop, tablet, smartphone, cellphone, or computer using graphical user interface (GUI)). A portal may be a website that functions as a central point of access to information on the internet or an intranet. The portal may be accessed from any electronic or computing device or communication system or device enabled to communicate through a network connection, either wirelessly or through wired connection. The portal may be utilized to receive information relating to one or more of the functions, processes or operations of the present invention. In one embodiment, the portal may be a web-based mobile application. The web-based mobile application may be useful in areas with extensive network coverage and user utilizing any number of different mobile platforms. The web-based mobile application may utilize the newest versions of language, such as HTML, CSS, JavaScript, or other similar languages.

Figure 5:
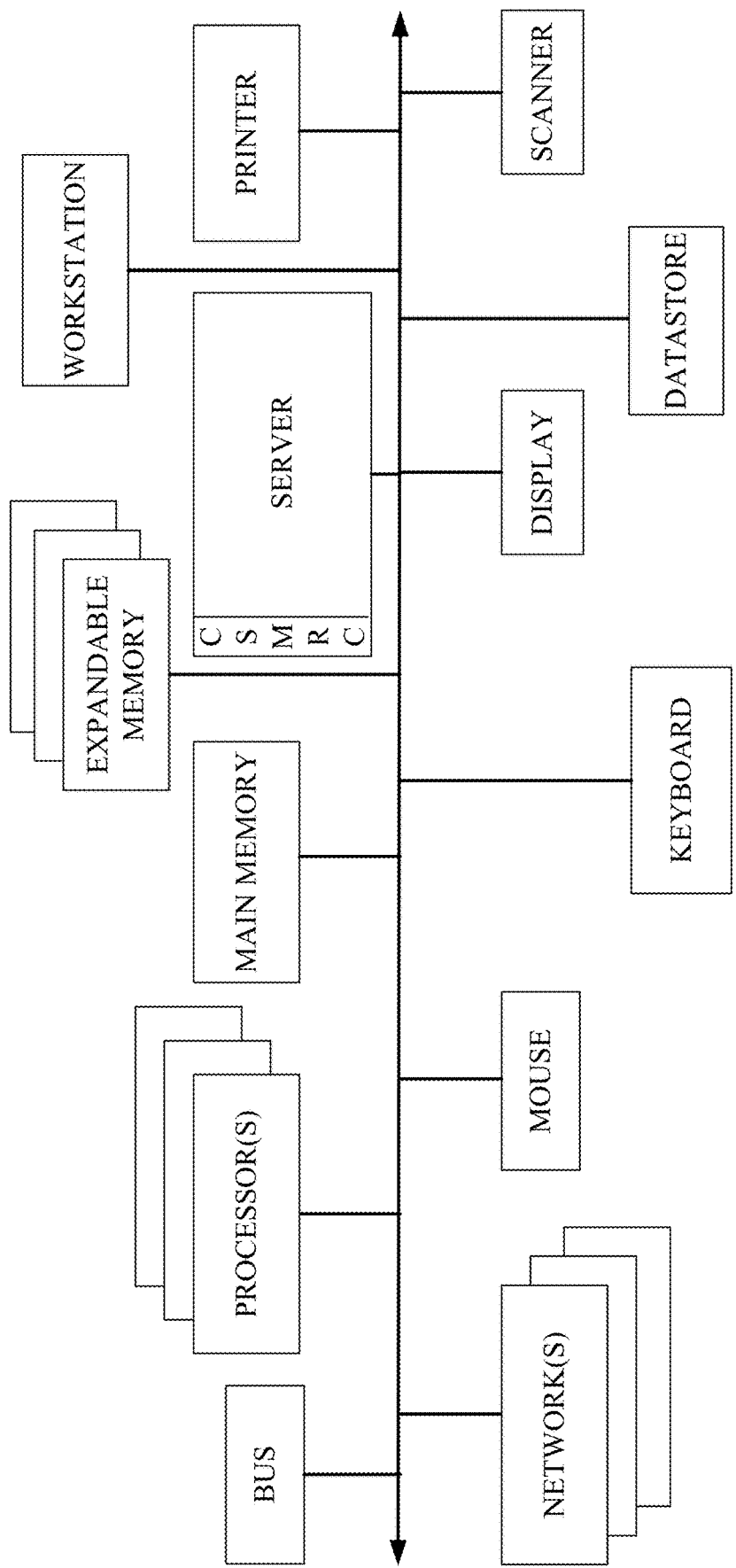
FIG. 5 is a flowchart representation of a process in accordance with an illustrative aspect of the present disclosure.

FIG. 5 provides a diagram for an exemplary process for a cold spray manufacturing and repair cell of the present disclosure. Aspects of the disclosure contemplate interfacing with, displaying, exchanging, sending, and receiving operations, commands, instructions, data, signals, results, and the like from the cold spray manufacturing and repair cell components of the present disclosure. By way of example, a work station, such as the one illustrated in FIG. 5, can be used to perform any one or more the operations, processes, functions, parameters of the present disclosure, including but not limited to operation and control of the cold spray manufacturing and repair cell. Specifically, a work station can be configured to control process development and planning, dimensional analysis, pre-machining, surface preparation, cold spray (supersonic particle deposition), dust collection, helium recovery, and post machining. The work station may be a type of electronic device, such as those previously described. In one embodiment, the work station may be an electronic device, programmable logic controller (PLC) or like code-enabled controller. Using the system, any one or more of the operations, processes, functions, and/or parameters of the present disclosure can be implemented in combination with any one or more of the aforementioned aspects of the invention. As shown, the system can be configured to include, for example, a server, in operable control of one or more operations, processes, functions and/or parameters of the cold spray manufacturing and repair cell of the present disclosure, a work station, a scanner, a printer, a data store for storing data, and other linked networks. The computer network may be configured to provide a communication path for each device of the network to communicate with other devices. Additionally, the computer network can be the internet, a public switchable telephone network, a local area network, private wide-area network, wireless network, and any of the like. FIG. 4 provides an exemplary embodiment of a communications network as previously described. In various embodiments, an automated control process for the cold spray manufacturing and repair cell of the present disclosure can be operated, at least in part, by an operating protocol which may be executed on a server and/or work station, similar to the work station shown in FIG. 5. For example, in one embodiment or aspect of the disclosure, the server can be configured to execute one or more cold spray manufacturing and repair cell protocols. The display can be used to communicate information to an operator. The scanner can be configured to perform an optical image acquisition process or protocol associated with one or more operations of the present disclosure. The printer can be configured to output any content to a print media, such as paper. Furthermore, data associated with any one or more of the processes, functions, parameters and/or operations of the cold spray manufacturing and repair cell of the present disclosure can be stored on the data store. The data store may additionally be configured to receive and/or forward some or all of the stored data. Moreover, in yet another aspect, some or all of the computer network and/or operating code can be subsumed within a single device, such as an electronic device. Although a work station is depicted in FIG. 5, it is understood that the invention is not limited to the operation within a computer work station, but rather the disclosure can be practiced in or on any suitable computer network or electronic device, such as a PLC. Accordingly, the work station depicted in FIG. 5 is for illustrative purposes only and thus is not meant to limit the present invention in any respect. Other elements of the network and processes of the cold spray manufacturing and repair cell can include a main memory, one or more processors, a bus, and elements of a user interface such as a mouse, keyboard, and/or display. One or more networks can be configured to operate in conjunction with the system or one or more aspects of the present disclosure.

3.0. Conclusions

Novel methods, systems and processes for integrating multiple advanced technologies into a single automated manufacturing and repair cell. The methods, systems and processes of the present disclosure leverage unique software and hardware to configure a manufacturing cell that is capable of conducting process development and planning, dimensional analysis, pre-machining, surface preparation, cold spray (supersonic particle deposition), dust collection, helium recovery, and post machining in a single integrated manufacturing and repair cell.

The disclosure is not to be limited to the particular embodiments described herein. In particular, the disclosure contemplates numerous variations in the type of ways in which embodiments of the disclosure can be applied to a cold spray manufacturing and repair cell. The foregoing description has been presented for purposes of illustration and description. It is not intended to be an exhaustive list or limit any of the disclosure to the precise forms disclosed. It is contemplated that other alternatives or exemplary aspects that are considered included in the disclosure. The description is merely examples of embodiments, processes or methods of the disclosure. It is understood that any other modifications, substitutions, and/or additions can be made, which are within the intended spirit and scope of the disclosure. For the foregoing, it can be seen that the disclosure accomplishes at least all that is intended.

The previous detailed description is of a small number of embodiments for implementing the disclosure and is not intended to be limiting in scope. Descriptions provided for any one single embodiment are not exclusive to any one embodiment but applicable for describing all features, functions, configurations of the embodiments as a whole, and more particularly the cold spray manufacturing and repair cell of the present disclosure. The following claims set forth a number of the embodiments of the disclosure with greater particularity.

What is claimed is:

1. An automated cold spray manufacturing and repair cell, comprising:
   a manufacturing cell having an enclosure body operably configured for housing an automated cold spray operation;
   one or more hardware devices and one or more software tools wherein one or more of the hardware devices and the one or more software tools are housed within the enclosure body, and further wherein the one or more hardware devices and the one or more software tools are configured to perform one or more tasks associated with the cold spray operation;
   a programmable logic controller having a control system with coding operable on a computer readable medium, wherein the coding controls the one or more hardware devices and one or more software tools for automating the cold spray operation;
   one or more inputs introduced into the enclosure body for the one or more tasks associated with the cold spray operation;
   one or more gas filters of a recovery system for reclaiming at least one gas from the one or more inputs;
   one or more purge lines of the recovery system for purging a gas from the one or more inputs, wherein the one or more purge lines are operably connected between at least one of the one or more gas filters and at least one of one or more low pressure and high pressure compressors;
   wherein at least one of the one or more inputs is repurposed within the enclosure body by the recovery system for supporting at least two or more of the tasks associated with the cold spray operation.

2. The automated cold spray manufacturing and repair cell of claim 1, wherein the one or more tasks comprise process development, process planning, and dimensional analysis.

3. The automated cold spray manufacturing and repair cell of claim 1, wherein the one or more tasks comprise pre-machining, surface preparation, cold spray deposition, dust collection, helium recovery, and post machining.

4. The automated cold spray manufacturing and repair cell of claim 1, wherein the manufacturing cell includes an antechamber which allows the main chamber to remain full of at least one of the one or more inputs while the one or more tasks are performed.

5. The automated cold spray manufacturing and repair cell of claim 1, wherein the one more inputs comprise helium.

6. The automated cold spray manufacturing and repair cell of claim 1, wherein a cold spray component is moved via a pallet changer to a machine tool for post cold spray machining while exposed to the one or more inputs.

7. The automated cold spray manufacturing and repair cell of claim 1, wherein the coding controls integrate the one or more software tools to facilitate a repair or manufacturing process from an initial laser scan or a dimensional probing with a machine tool, to a pre-machining process of the part, to a cold spray operation inside the manufacturing cell, back to a post machining process, and a final dimensional probing or nondestructive inspection.

8. A method for controlling an automated cold spray manufacturing and repair cell, comprising:
   providing a manufacturing cell having an enclosure body operably configured for housing an automated cold spray operation and a programmable logic controller having a control system with coding operable on a computer readable medium;
   controlling one or more hardware devices and one or more software devices wherein one or more of the hardware and software devices are housed within the enclosure body;
   coding one or more software controls on the programmable logic controller for executing one or more tasks of the cold spray operation;
   introducing one or more inputs into the enclosure body for supporting at least two or more of the one or more tasks associated with the cold spray operation;
   reclaiming at least one gas from the one or more inputs with one or more gas filters of a recovery system;
   purging a gas from the one or more inputs with one or more purge lines of the recovery system, wherein the one or more purge lines are operably connected between at least one of the one or more gas filters and one or more low pressure compressors, and one or more high pressure compressors;
   reusing the at least one gas within the enclosure body for performing one or more tasks of the cold spray operation.

9. The method of claim 8, wherein the one or more tasks comprise process development, process planning, and dimensional analysis.

10. The method of claim 8, wherein the one or more tasks comprise pre-machining, surface preparation, cold spray deposition, dust collection, helium recovery, and post machining.

11. The method of claim 8, wherein the manufacturing cell includes an antechamber which allows the main chamber to remain full of at least one of the one or more inputs while the one or more tasks are performed.

12. The method of claim 8, wherein the one more inputs comprise helium.

13. The method of claim 8, wherein a cold spray component is moved via a pallet changer to a machine tool for post cold spray machining while exposed to the one or more inputs.

14. The method of claim 8, wherein the coding controls integrate the one or more software tools to facilitate a repair or manufacturing process from an initial laser scan or a dimensional probing with a machine tool, to a pre-machining process of the part, to a cold spray operation inside the manufacturing cell, back to a post machining process, and a final dimensional probing or nondestructive inspection.

15. A process for controlling an automated cold spray manufacturing and repair cell, comprising:
   providing a manufacturing cell having an enclosure body operably configured for housing an automated cold spray operation and a programmable logic controller having a control system with coding operable on a computer readable medium;
   controlling one or more hardware devices and one or more software tools wherein the one or more hardware devices and the one or more software tools are housed within the enclosure body;
   coding one or more software controls on the programmable logic controller for executing one or more tasks of the automated cold spray operation;
   introducing one or more inputs into the enclosure body, wherein at least one of the one or more inputs comprises a dry powder and another of the one or more inputs comprises a gas;
   spraying the dry powder with the gas in the automated cold spray process;
   recovering the gas with a gas recovery system comprising at least one gas filtering membrane;

purging a gas from the recovered gas with one or more purge lines of the gas recovery system, wherein the one gas filtering membrane is operably connected to at least one of one or more low pressure compressors, wherein the one or more purge lines are operably connected between the at least one low pressure compressor and at least one high pressure compressor;

recycling the recovered gas for spraying the dry powder in the automated cold spray process within the enclosure body for supporting the one or more tasks associated with the automated cold spray operation.

16. The process of claim 15, wherein the one or more tasks comprise process development, process planning, and dimensional analysis.

17. The process of claim 15, wherein the one or more tasks comprise pre-machining, surface preparation, cold spray deposition, dust collection, helium recovery, and post machining.

18. The process of claim 15, wherein the manufacturing cell includes an antechamber which allows the main chamber to remain full of at least one of the one or more inputs while the one or more tasks are performed.

19. The process of claim 15, wherein the one more inputs comprise helium.

20. The process of claim 15, wherein the coding controls integrate the one or more software tools for facilitating a repair or manufacturing process performed within the manufacturing cell, comprising:

a. an initial laser scan and/or a dimensional probing with a machine tool;

b. a pre-machining process of the part;

c. a cold spray operation;

d. a post machining process;

e. a dimensional probing and/or nondestructive inspection.

* * * * *